United States Patent
Nishimura et al.

(10) Patent No.: US 11,722,225 B2
(45) Date of Patent: Aug. 8, 2023

(54) UNDERWATER OPTICAL COMMUNICATION DEVICE AND UNDERWATER INSPECTION SYSTEM

(71) Applicant: Shimadzu Corporation, Kyoto (JP)

(72) Inventors: Naoki Nishimura, Kyoto (JP); Koji Tojo, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/795,212

(22) PCT Filed: Jan. 27, 2020

(86) PCT No.: PCT/JP2020/002849
§ 371 (c)(1),
(2) Date: Jul. 25, 2022

(87) PCT Pub. No.: WO2021/152677
PCT Pub. Date: Aug. 5, 2021

(65) Prior Publication Data
US 2023/0051043 A1 Feb. 16, 2023

(51) Int. Cl.
*H04B 10/00* (2013.01)
*H04B 10/80* (2013.01)
*H04J 14/00* (2006.01)

(52) U.S. Cl.
CPC .................................... *H04B 10/80* (2013.01)

(58) Field of Classification Search
CPC ....................................................... H04B 10/80
See application file for complete search history.

(56) References Cited

U.S. PATENT DOCUMENTS

| 6,592,245 B1 | 7/2003 | Tribelsky et al. |
| 2007/0183782 A1 | 8/2007 | Farr et al. |

(Continued)

FOREIGN PATENT DOCUMENTS

| CN | 206608901 U | 11/2017 |
| JP | 03-200202 A | 9/1991 |

(Continued)

OTHER PUBLICATIONS

Decision of Refusal dated Aug. 31, 2021 for Taiwan Patent application No. TW109142245.

(Continued)

*Primary Examiner* — Daniel G Dobson
(74) *Attorney, Agent, or Firm* — Muir Patent Law, PLLC (57) ABSTRACT

A first optical communication device is provided with a laser light source 3 for emitting communication light CL and a transmitting optical fiber 11 arranged in water WA and having a light incident end portion 14 on which the communication light CL is incident. The transmitting optical fiber 11 transmits the communication light CL incident on the light incident end portion 14 toward the tip end portion 15. The transmitting optical fiber 11 is provided with a core part 21 configured to transmit the communication light CL from the light incident end portion 14 toward the tip end portion 15 and a clad part 23 covering the core part, the clad part being configured to emit at least a part of the communication light CL that transmits the core part 21 from a side surface of the transmitting optical fiber 11.

7 Claims, 7 Drawing Sheets

(56) References Cited

U.S. PATENT DOCUMENTS

2019/0305521 A1 10/2019 Nishi et al.
2020/0264389 A1* 8/2020 Ishibashi .............. G02B 6/4287

FOREIGN PATENT DOCUMENTS

| JP | H05-281393 | A | 10/1993 |
|----|------------|---|---------|
| JP | 2001133652 | A | 5/2001 |
| JP | 2001512616 | A | 8/2001 |
| JP | 2018007069 |   | 1/2018 |
| JP | 2019176046 | A | 10/2019 |
| JP | 2019186595 | A | 10/2019 |
| WO | 2019049598 | A1 | 3/2019 |

OTHER PUBLICATIONS

Non-final Rejection dated May 18, 2021 for Taiwan Patent application No. TW109142245.
Notification of Reasons for Refusal dated Apr. 13, 2023 of Japanese Patent application No. 2021-573650, and its machine translation.

* cited by examiner

UNDERWATER OPTICAL COMMUNICATION DEVICE AND UNDERWATER INSPECTION SYSTEM

TECHNICAL FIELD

The present invention relates to an underwater optical communication device and an underwater inspection system.

BACKGROUND ART

Conventionally, communication using acoustic waves with low attenuation in water has been used as an underwater wireless communication means for transmitting data from an underwater vehicle, etc., for underwater exploration. Such wireless communication by acoustic waves has been problematic in that only a communication speed as low as several tens of kbps can be realized due to the low underwater propagation speed of acoustic waves and the low frequencies of acoustic waves.

In recent years, an optical wireless communication system using an optical communication device utilizing visible light has been proposed as an underwater wireless communication means. The optical communication device is provided with a laser light source for emitting laser light which is visible light and an optical receiver for receiving the laser light emitted from the laser light source. An exemplary optical wireless communication system is configured such that wireless communication is performed by transmitting communication light to each other between a first optical communication device provided on an observation device installed underwater and a second optical communication device provided on a submarine navigating underwater (see, e.g., Patent Documents 1 and 2).

Compared with sound waves, visible light is relatively small in attenuation in water. Since visible light is higher in the propagation speed and the frequency as compared with sound waves, it is possible to realize a high communication speed as high as several tens of Mbps by optical wireless communication using visible light.

A conventional optical wireless communication device is provided with a water pressure-resistant container, a laser generation source provided on one end side in the water pressure-resistant container, a light-emitting window provided on the other end side in the water pressure-resistant container, and an optical fiber arranged from one end side in the water pressure-resistant container toward the other end side. The laser light generated by the laser generation source is incident on the base end portion of the optical fiber and transmitted to the tip end portion of the optical fiber. Then, the laser light transmitted to the tip end portion of the optical fiber is emitted to the outside (in the water) of the water pressure-resistant container through the light-emitting window (see, e.g., Patent Document 3).

PRIOR ART DOCUMENT

Patent Document

Patent Document 1: Japanese Unexamined Patent Application Publication No. 2018-007069
Patent Document 2: Japanese Unexamined Patent Application Publication No. 2019-186595
Patent Document 3: Japanese Unexamined Patent Application Publication No. 2019-176046

SUMMARY OF THE INVENTION

Patent Document

Problems to be Solved by the Invention

However, the conventional example having the above-described configuration has the following problems.

An optical fiber transmits an optical signal from one end to the other end. Therefore, in the case of transmitting an optical signal using a single optical fiber, the optical signal is transmitted only to one point of the tip end portion of the optical fiber. Therefore, in the case of transmitting an optical signal generated by a laser generation source to a plurality of locations, it is required to prepare a plurality of optical fibers in accordance with the number of locations to which the optical signal is transmitted. Therefore, there is a concern that the circuit of the optical fiber in the optical communication device becomes complex.

The present invention has been made in view of the above-described circumstances. It is an object of the present invention to provide an underwater optical communication device and an underwater inspection system capable of transmitting an optical signal to a greater variety of locations while simplifying the configuration.

Means for Solving the Problem

According to a first aspect of the present invention, an underwater optical communication device includes:
a light-emitting element configured to emit communication light; and
an optical fiber arranged in water, the optical fiber having a light incident end portion on which the communication light is incident and a tip end portion, the optical fiber being configured to transmit the communication light incident on the light incident end portion toward the tip end portion,
wherein the optical fiber is composed of:
a core part configured to transmit the communication light from the light incident end portion toward the tip end portion; and
a clad part covering the core part, the clad part being configured to emit at least a part of the communication light that transmits the core part from a side surface of the optical fiber.

Effects of the Invention

In the underwater optical communication device according to the present invention, the communication light emitted by the light-emitting element is transmitted from the light incident end portion of the optical fiber to the tip end portion thereof and is emitted from the side surface of the optical fiber. Therefore, the communication light can be transmitted in a plurality of directions toward the tip end portion side and the side surface side by a single optical fiber. Therefore, an optical communication device capable of performing optical communication to various locations can be realized in a simpler configuration.

EMBODIMENTS FOR CARRYING OUT THE INVENTION

First Embodiment

<Description of Overall Configuration>

Figure 1:
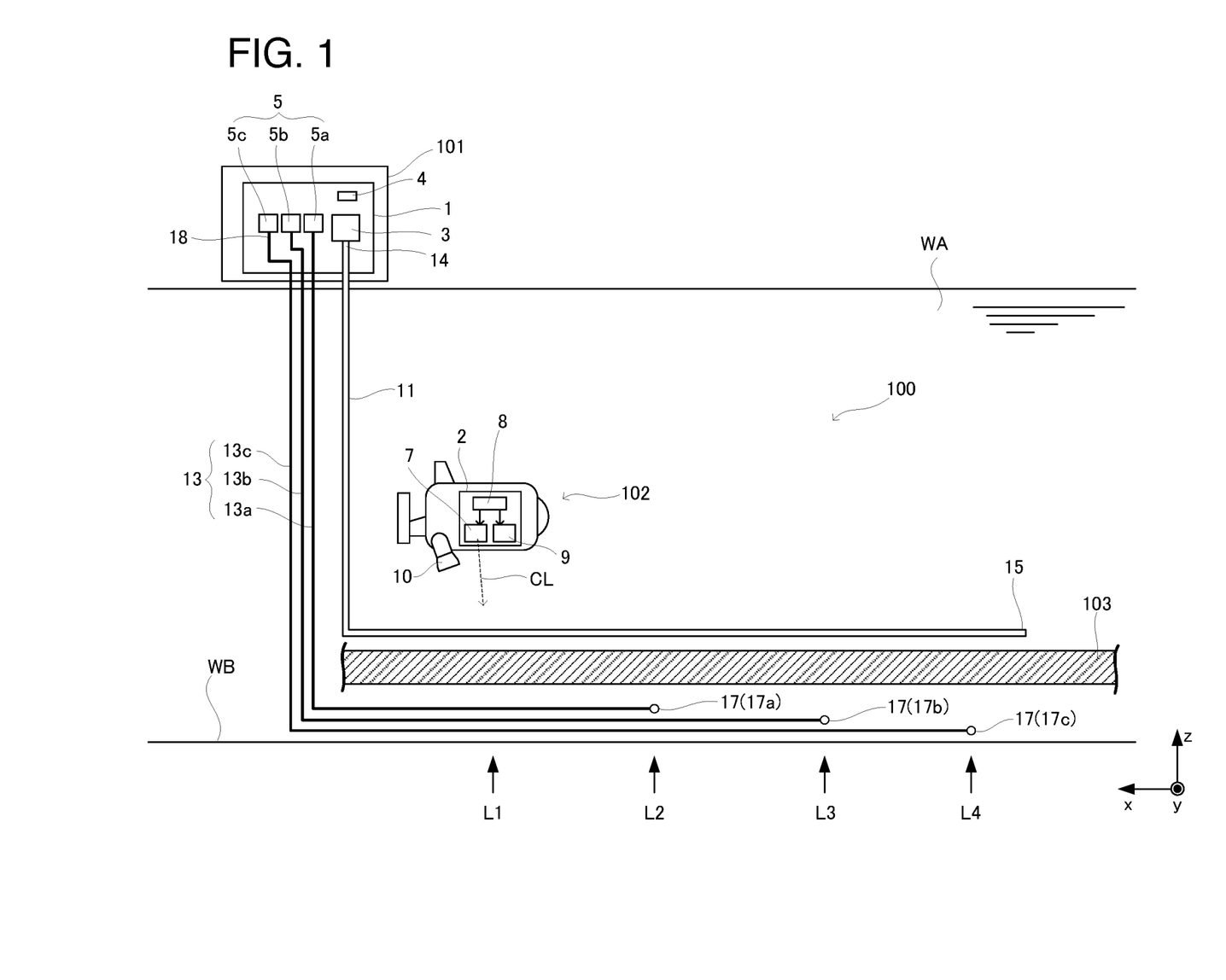
FIG. 1 is a diagram for explaining a schematic configuration of an underwater inspection system equipped with an optical communication device according to a first embodiment.

With reference to FIG. 1, a schematic configuration of an underwater inspection system 100 equipped with an optical communication device according to a first embodiment will be described. Note that, as shown in FIG. 1, etc., two horizontal directions perpendicular to each other are denoted as an x-direction and a y-direction. The x-direction corresponds to the right-and-left horizontal direction in the drawing. Further, the vertical direction is denoted as a z-direction.

As shown in FIG. 1, the underwater inspection system 100 is provided with a first optical communication device 1 provided on a fixed station 101 and a moving body 102 equipped with a second optical communication device 2. Examples of the fixed station 101 include a ship navigating on the water, and a ground base installed on the ground.

The moving body 102 inspects an underwater structure 103 by moving in the water WA. Examples of the moving body 102 include a submarine, particularly an ROV (Remotely Operated Vehicle) or an AUV (Autonomous Underwater Vehicle). Examples of the underwater structure 103 include a pipeline arranged along the water bottom WB. In this embodiment, a pipeline arranged to extend in the x-direction is used as the underwater structure 103.

Note that in this embodiment, the initial position of the moving body 102 in the x-direction is denoted by the reference symbol L1. It is assumed that the underwater structure 103 has three positions (inspection points) to be inspected by the moving body 102. The position of each inspection point in the x-direction is denoted by L2 to L4. Hereinafter, three inspection points are distinguished as inspection points L2 to L4.

As shown in FIG. 1, the first optical communication device 1 is provided with a laser light source 3, a controller 4, and a plurality of light-receiving elements 5. The second optical communication device 2 is provided with a laser light source 7, a controller 8, a light-receiving element 9, and an observation device 10. The first optical communication device 1 corresponds to the underwater optical communication device according to the present invention.

The laser light source 3 and the laser light source 7 are each provided with a light-emitting element and a collimating lens, and the laser light generated by the light-emitting element is adjusted to parallel light by the collimating lens to be emitted to the outside. Examples of the light emitted by the laser light source 3 or the laser light source 7 include communication light CL including communication information. The communication light CL is preferably visible light of a blue wavelength or visible light of a green wavelength in terms of reducing the attenuation in the water WA.

The light-receiving element 5 receives the laser light emitted from the laser light source 7 provided in the second optical communication device 2. The light-receiving element 9 receives the laser light emitted from the laser light source 3 provided in the first optical communication device 1. The observation device 10 is, for example, an underwater camera. The observation device 10 is configured to observe the underwater structure 103 at the inspection points L2 to L4 and acquires information, such as, e.g., still images and moving images.

The light received by each of the light-receiving element 5 and the light-receiving element 9 is converted into an electric signal and subjected to various information processing by an information processing unit (not shown). With this, communication information, such as, e.g., a moving image, is generated. In this embodiment, the light-receiving elements 5 are provided to correspond to the plurality of inspection points L2 to L4. That is, in this embodiment, three light-receiving elements 5 are provided. These light-receiving elements 5 are distinguished as light-receiving elements 5a to 5c.

The controller 4 is provided with, for example, a central processing unit (CPU: Central Processing Unit) and includes an information processing unit. The controller 4 performs various processing on the information included in the light received by the light-receiving element 5 and collectively controls the respective configurations provided in the first optical communication device 1.

The controller 8 is provided with, e.g., a central processing unit and includes an information processing unit. The controller 8 performs various processing on the information included in the light received by the light-receiving element 9 and collectively controls the respective configurations provided in the second optical communication device 2.

The first optical communication device 1 is further provided with a transmitting optical fiber 11 and a plurality of receiving optical fibers 13. The transmitting optical fiber 11 is arranged along the underwater structure 103 and is provided with a base end portion 14 and a tip end portion 15. The base end portion 14 is arranged to face or contact the laser light source 3. The tip end portion 15 is arranged in the water WA. The laser light emitted from the laser light source 3 is incident on the base end portion 14 of the transmitting optical fiber 11, and the laser light is transmitted toward the tip end portion 15. The base end portion 14 corresponds to the light incident end portion in the present invention.

The plurality of receiving optical fibers 13 is arranged, similarly to the transmitting optical fiber 11, along the underwater structure 103. The plurality of receiving optical fibers 13 is provided to correspond to the plurality of light-receiving elements 5 and is configured to guide the light to each of the light-receiving elements 5. That is, in this embodiment in which three light-receiving elements 5 are provided, three receiving optical fibers 13 are provided, and one receiving optical fibers 13 is arranged for one light-receiving element 5.

For the plurality of receiving optical fibers 13, the receiving optical fiber 13 corresponding to the light-receiving element 5a is distinguished by assigning the reference symbol 13a. That is, the light-receiving elements 5a to 5c are arranged to correspond the optical fibers 13a to 13c, respectively.

Each receiving optical fiber 13 is provided with a first end portion 17 and a second end portion 18. The first end portion 17 is arranged in the water WA. The second end portion 18 is arranged to face or contact the light-receiving element 5. That is, the light emitted from the laser light source 7 of the second optical communication device into the water WA is incident on the first end portion 17 and transmitted to the second end portion 18, and then guided to the light-receiving element 5. Note that the first end portions 17 of the receiving optical fibers 13a to 13c are distinguished by assigning the reference symbols 17a to 17c, respectively.

The first end portion 17a of the receiving optical fiber 13a is arranged at the position corresponding to the inspection point L2 in the x-direction. The first end portion 17b of the receiving optical fiber 13b is arranged at the position corresponding to the inspection point L3. The first end portion 17c of the receiving optical fiber 13c is arranged at the position corresponding to the inspection point L4. That is, for example, the light emitted from the laser light source 7 to the receiving optical fiber 13 at the inspection point L4 is incident on the first end portion 17c and guided to the light-receiving element 5c.

As described above, the underwater inspection system 100 is configured such that the first optical communication device 1 and the second optical communication device 2 transmit communication information to each other by emitting the laser light from one of them to the other to thereby perform optical wireless communication in the water WA.

<Configuration of Transmitting Optical Fiber>

Figure 2:
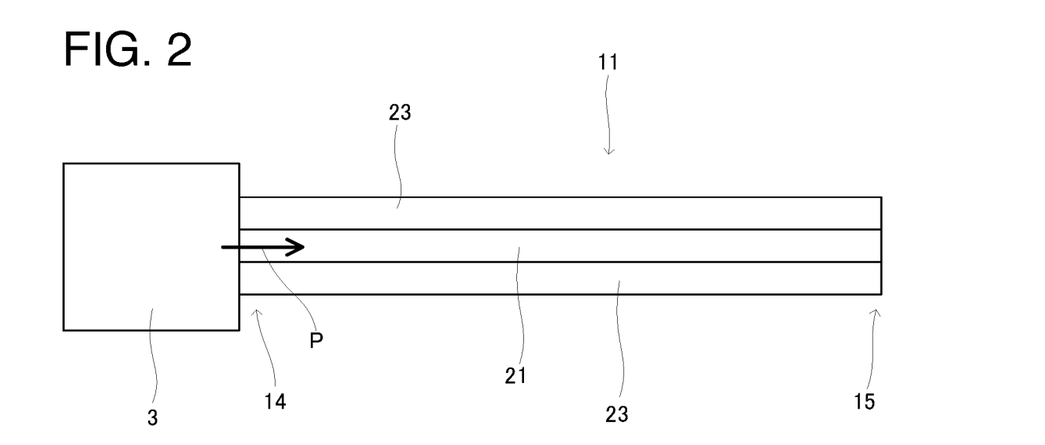
FIG. 2 is a cross-sectional view illustrating the main part of the optical communication device according to the first embodiment.

Here, the configuration of the transmitting optical fiber 11 according to the first embodiment will be described. As shown in FIG. 2, the transmitting optical fiber 11 is provided with a core part 21 constituting the center portion of the transmitting optical fiber 11 and a clad part 23 covering the peripheral side part of the core part 21. The core part 21 is made of a material higher in the optical refractive index than the clad part 23, and the light P generated by the laser light source 3 mainly passes through the inside of the core part 21 to be transmitted toward the tip end portion 15.

As the feature of the first embodiment, the clad part 23 is configured to emit at least a part of the light that transmits the core part 21 from the side surface of the transmitting optical fiber 11. Specifically, it is set such that the difference between the optical refractive index of the material constituting the clad part 23 and the optical refractive index of the material constituting the core part 21 is small.

Figure 3:
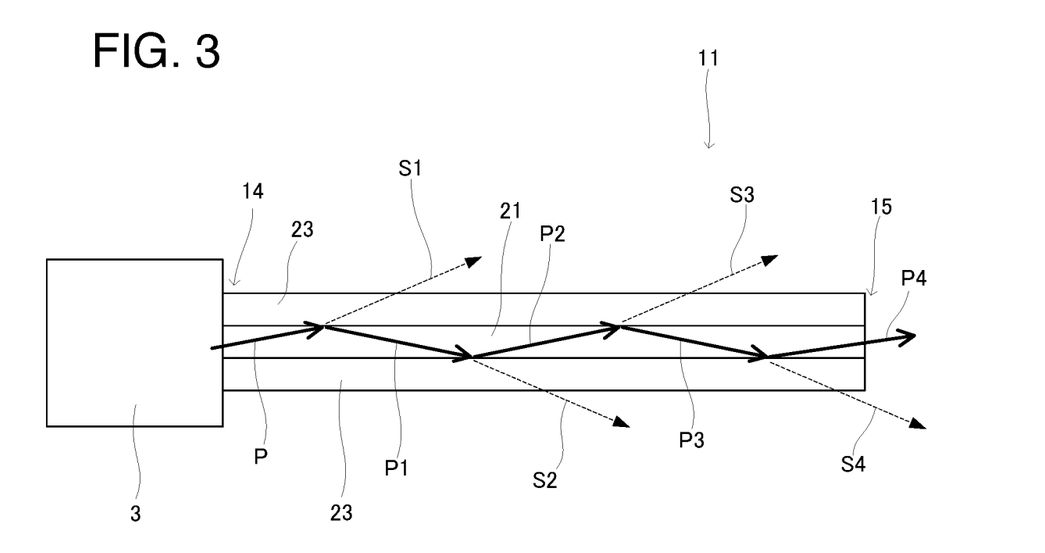
FIG. 3 is a cross-sectional view illustrating the features of the optical communication device according to the first embodiment.

By appropriately setting the optical refractive index of the material constituting the clad part 23, a part of the light enters the clad part 23 from the core part 21 at the boundary surface between the core part 21 and the clad part 23 and is emitted to the outside of the transmitting optical fiber 11 through the side surface of the clad part 23. That is, as shown in FIG. 3, when the light P1 generated by the laser light source 3 and transmitted the core part 21 reaches the boundary surface between the core part 21 and the clad part 23, a part of the light P1 enters the clad part 23 as entry light S1.

The remaining part of the light P1 is reflected to the inside of the core part 21 as light P2. Hereinafter, each time the light P2 and the light P3 reach the boundary surface between the core part 21 and the clad part 23, a part of the light enters the clad part 23 as entry light S2 and S3. The light P4 transmitted from the base end portion 14 to the tip end portion 15 without entering the clad part 23 is emitted from the tip end portion 15.

On the other hand, each of the entry lights S1 to S3 entered from the core part 21 to the clad part 23 is emitted to the outside (i.e., in the water WA) of the transmitting optical fiber 11 via the side surface of the clad part 23. Consequently, in the transmitting optical fiber 11 according to the first embodiment, at least a part of the light P emitted from the laser light source 3 is emitted from the side surface.

Therefore, the transmitting optical fiber 11 can guide the light P generated by the laser light source 3 in the direction toward the tip end portion 15 and also can guide it in the direction toward the side surface. The light P is guided in the direction toward the side surface. Therefore, when the transmitting optical fiber 11 is viewed from the side surface, it is possible to confirm the light emitted from the entire side surface of the transmitting optical fiber 11 in accordance with the timing at which the laser light source 3 emits an optical signal. Therefore, by using a single transmitting optical fiber 11, it is possible to transmit the light generated from the laser light source 3 to a plurality of points.

<Application Example of First Embodiment>

Next, an application example of the underwater inspection system 100 according to the first embodiment will be described. In this embodiment, as shown in FIGS. 4 to 7, the moving body 102 performs the inspection at each of three inspection points while traveling along the underwater structure 103 from the initial position L1 to the inspection point L4. While performing the movement and the inspection, the moving body 102 performs optical wireless communication with the first optical communication device 1 using the second optical communication device 2. Hereinafter, a series of steps of the operation using the underwater inspection system 100 will be described below.

Step S1 (Movement of Moving Body)

Figure 4:
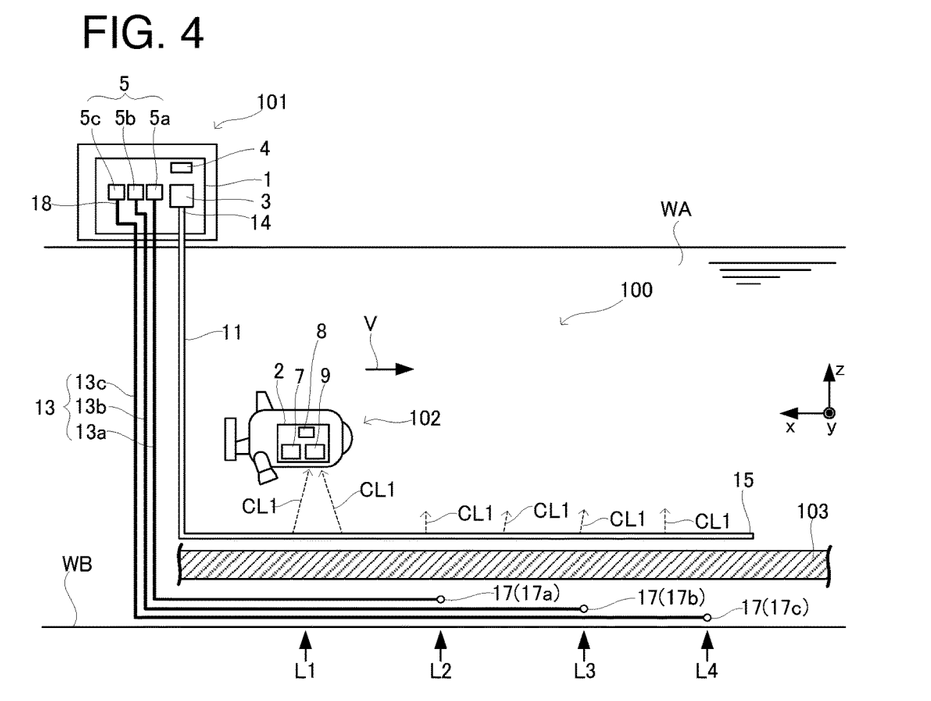
FIG. 4 is a diagram illustrating the process of Step S1 according to the first embodiment.

First, in order to move the moving body 102 from the initial position L1 to the first inspection point L2, optical wireless communication is performed from the first optical communication device 1 to the second optical communication device 2. In the fixed station 101, the laser light source 3 provided in the first optical communication device 1 is controlled to emit communication light CL (hereinafter referred to as "communication light CL1") including a command to move the moving body to the inspection point L2. The emitted communication light CL1 is incident on the base end portion 14 of the transmitting optical fiber 11.

The communication light CL1 incident on the base end portion 14 is transmitted toward the tip end portion 15 along the core part 21 of the transmitting optical fiber 11. When the transmission is performed, at least a part of the communication light CL1 enters from the core part 21 to the clad part 23 and is emitted from the peripheral side part of the clad part 23 into the water WA (see FIG. 3).

That is, as shown in FIG. 4, at least a part of the communication light CL1 is emitted from the side surface of the transmitting optical fiber 11. Since the moving body 102 travels along the underwater structure 103, the moving body 102 is positioned in the vicinity of the side surface of the transmitting optical fiber 11. Therefore, at least a part of the communication light CL1 emitted from the side surface of the transmitting optical fiber 11 is received by the light-receiving element 9 provided in the second optical communication device 2.

The communication light CL1 received by the light-receiving element 9 is subjected to photoelectric conversion by the light-receiving element 9 and various information processing by an information processing unit (not shown) to thereby generate communication information indicating to move the moving body 102 to the inspection point L2. The moving body 102 starts moving from the initial position L1 to the inspection point L2 according to the communication information. The moving direction of the moving body 102 is indicated by the arrow V.

Step S2 (Inspection of Underwater Structure)

Figure 5:
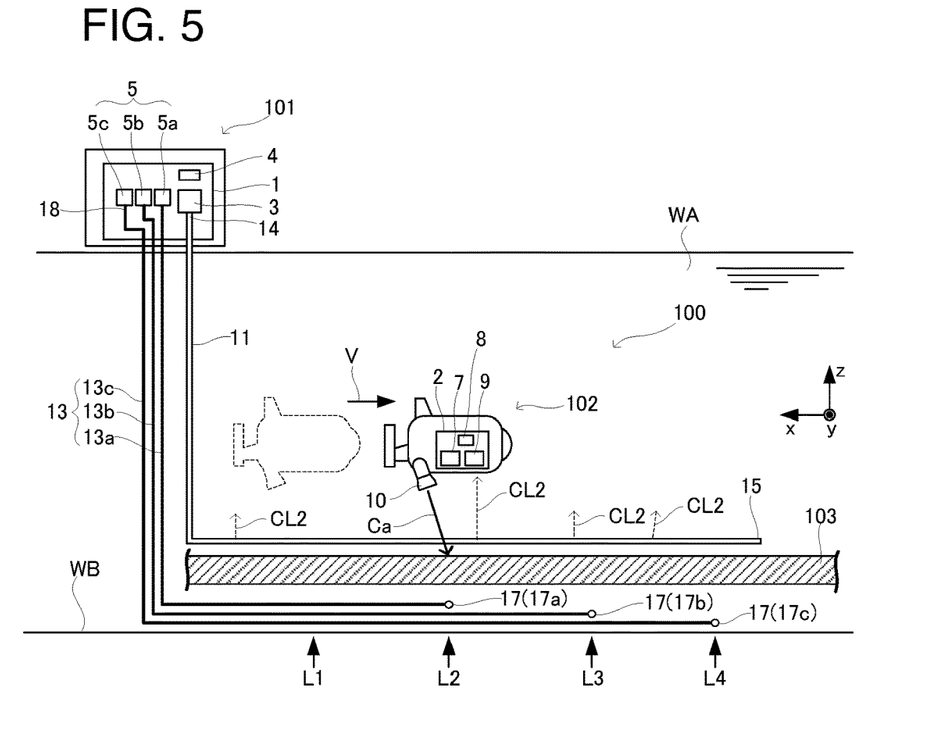
FIG. 5 is a diagram illustrating the process of Step S2 according to the first embodiment.

After the movement of the moving body 102 to the inspection point L2 as shown in FIG. 5 in accordance with the optical wireless communication according to Step S1, it is required to perform the inspection at the inspection point L2. Therefore, optical wireless communication from the first optical communication device 1 to the second optical communication device 2 is again performed. That is, the laser light source 3 is again controlled in the fixed station 101 to emit communication light CL (hereinafter referred to as "communication light CL2") including a command to perform the inspection at the inspecting inspection point L2 using the observation device 10. The emitted communication light CL2 is incident on the base end portion 14.

The transmitting optical fiber 11 transmits the communication light CL2 toward the tip end portion 15 and emits at least a part of the communication light CL2 from the side surface of clad part 23 into the water WA. As shown in FIG. 5, the communication light CL2 emitted toward the side of the transmitting optical fiber 11 is received by the light-receiving element 9 in the moving body 102. The communication light CL2 received by the light-receiving element 9 is converted to communication information indicating that the inspecting inspection point L2 is inspected. The moving body 102 activates the observation device 10 based on the communication information to inspect the underwater structure 103 at the inspection point L2 (see the reference symbol Ca). The information acquired by the inspection is stored in a storage device (not shown) provided in the moving body 102.

Step S3 (Transmission of Inspection Information)

Figure 6:
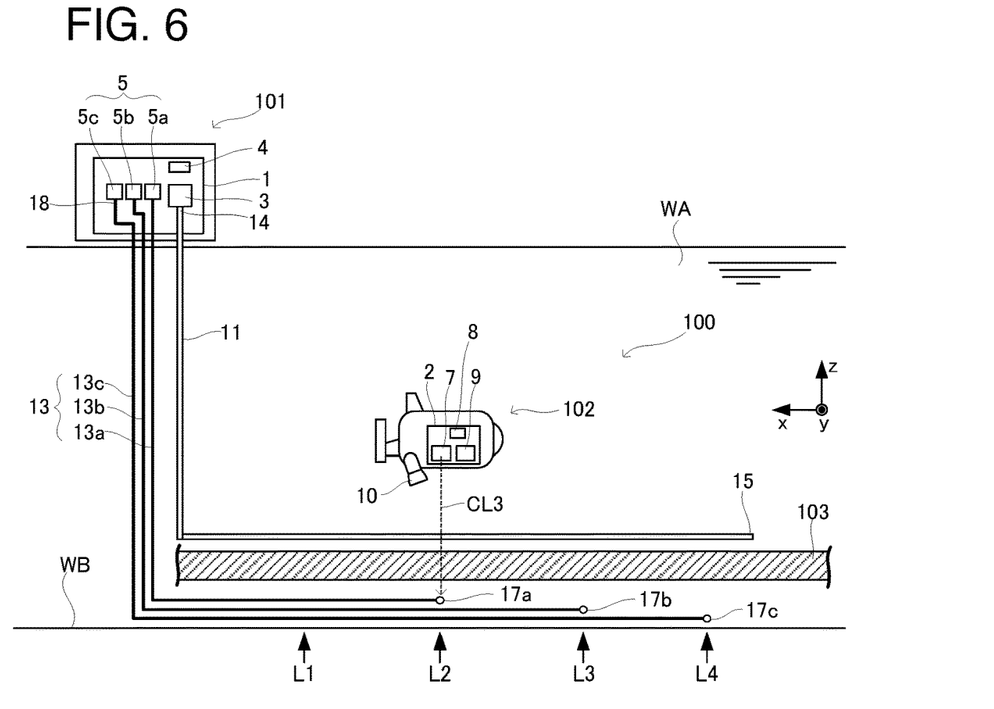
FIG. 6 is a diagram illustrating the process of Step S3 according to the first embodiment.

After the inspection of the underwater structure 103 by the moving body 102, it is necessary to transmit the information acquired by the inspection of the underwater structure 103 from the moving body 102 to the fixed station 101. Therefore, optical wireless communication is performed from the second optical communication device 2 toward the first optical communication device 1. The moving body 102 controls the laser light source 7 provided in the second optical communication device 2 to emit communication light CL (hereinafter referred to as "communication light CL3") including the content of the inspection data of the underwater structure 103 toward the receiving optical fiber 13.

The emitted communication light CL3 propagates in the water WA as shown in FIG. 6 and is incident on the first end portion 17a of the receiving optical fiber 13a arranged corresponding to the inspection point L2. The communication light CL incident on the first end portion 17a is transmitted to the second end portion 18 by the receiving optical fiber 13a and is received by the light-receiving element 5a. The communication light CL3 received by the light-receiving element 5 is subjected to photoelectric conversion and various information processing to thereby generate communication information indicating the inspection data of the underwater structure 103 at the inspection point L2. The communication information indicating the inspection data of the underwater structure 103 is stored in a storage device provided in the fixed station 101.

Figure 7:
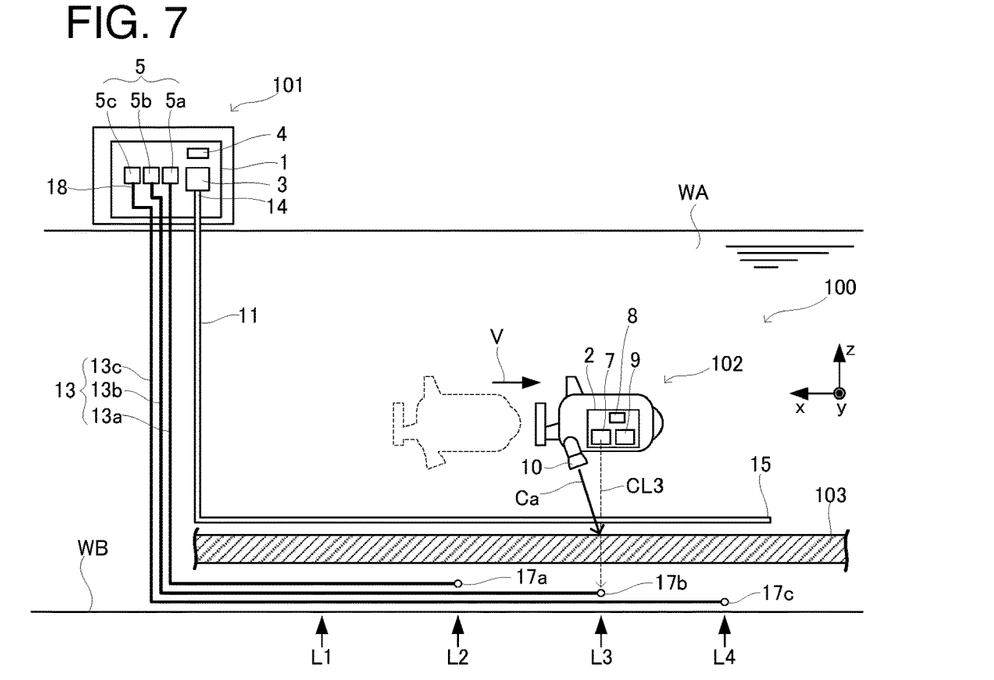
FIG. 7 is a diagram illustrating the process of Step S4 according to the first embodiment.

Hereinafter, the underwater structure 103 is inspected at the inspection point L3 and the inspection point L4 by repeating the steps according to Step S1 to S3. That is, optical wireless communication from the first optical communication device 1 toward the second optical communication device 2 is performed to transmit a command to move the moving body 102 to the inspection point L3 and inspect the underwater structure 103 at the inspection point L3. After the moving body 102 has moved to the inspection point L3 and the underwater structure 103 has been inspected, optical wireless communication from the second optical communication device 2 to the first optical communication device 1 is performed to transmit the inspection data of the underwater structure 103. FIG. 7 shows the state in which the moving body 102 moved from the inspection point L2 to the inspection point L3 inspects the underwater structure 103 at the inspection point L3 and emits communication light CL3 to the first end portion 17b of the transmitting optical fiber 13b.

After the inspection data of the underwater structure 103 at the inspection point L3 is transmitted, the movement of the moving body 102 to the inspection point L4, the inspection of the underwater structure 103 at the inspection point L4, and the transmission of the inspection data of the underwater structure 103 are performed by the optical wireless communication between the first optical communication device 1 and the second optical communication device 2.

<Effects of First Embodiment>

In the first optical communication device 1 according to this embodiment, the first optical communication device 1 is provided with the laser light source 3 for emitting communication light CL and the transmitting optical fiber 11 arranged in the water WA. The transmitting optical fiber 11 has the light incident end portion 14 on which communication light CL is incident and transmits the communication light CL incident on the light incident end portion 14 toward the tip end portion 15. The transmitting optical fiber 11 is provided with the core part 21 and the clad part 23. The core part 21 transmits the communication light CL from the light incident end portion 14 to the tip end portion 15. The clad part 23 covers the core part 21 and emits at least a part of the communication light CL that transmits the core part 21 from the side surface of the transmitting optical fiber 11.

With this configuration, the transmitting optical fiber 11 can transmit the communication light CL not only in the direction toward the tip end portion 15 but also in the direction toward the side surface. With this configuration, by using a single transmitting optical fiber 11, it is possible to emit the communication light CL toward a plurality of locations. In the application example described in this embodiment, the transmitting communication light CL can be transmitted to each of at least the initial position L1 and the inspection points L2 to L4 by using a single transmitting optical fiber 11. Therefore, in the first optical communication device 1 for performing optical wireless communication with respect to a plurality of locations, it is possible to reduce the number of transmitting optical fibers 11, and therefore, the simplification of the circuit and the cost-reduction of the device can be attained.

Further, the optical refractive index of the material constituting the core part 21 and the optical refractive index of the material constituting the clad part 23 are set such that at least a part of the communication light CL that transmits the core part 21 is emitted from the side surface of the transmitting optical fiber 11 via the clad part 23. In this case, since at least a part of the communication light CL can be emitted from the entire side surface of the clad part 23, the communication light CL can be transmitted toward more locations by using a single transmitting optical fiber 11. Further, since the clad part 23 that emits light to the side surface can be realized by selecting the material having an appropriate optical refractive index, the production of the transmitting optical fiber 11 becomes easy.

Further, in the underwater inspection system 100 according to this embodiment, the underwater inspection system is provided with the first optical communication device 1 and the moving body 102 for inspecting the underwater structure 103 as an inspection target extending in the x-direction while moving in the x-direction. The transmitting optical fiber 11 is arranged along the underwater structure 103. The moving body 102 is provided with the light-receiving element 9 for receiving the communication light CL emitted from the side surface of the clad part 23 and the controller 8 for controlling the moving body 102 based on the communication light CL received by the light-receiving element 9.

With this configuration, the moving body 102 can receive the communication light CL emitted from the side surface of the transmitting optical fiber 11 at a plurality of positions when inspecting the underwater structure 103 while traveling in the x-direction. That is, the moving body 102 can receive the communication light CL at a plurality of locations in a state in which the first optical communication device 1 using a single transmitting optical fiber 11 is provided as a transmission side. Therefore, the underwater inspection system 100 that can inspect the underwater structure 103 at a plurality of locations while performing optical wireless communication can be realized by using a single transmitting optical fiber 11.

Further, in the underwater inspection system 100 according to this embodiment, the underwater structure 103 is a pipeline, and the moving body 102 is a submarine. With this configuration, an underwater inspection system for inspecting a plurality of parts of a pipeline arranged on the water bottom WB, etc., by a submarine moving in a predetermined direction can be realized at low cost.

Secondary Embodiment

Next, a second embodiment of the present invention will be described. In the second embodiment, the configuration of the transmitting optical fiber 11 differs from that of the first embodiment. Therefore, the transmitting optical fiber according to the second embodiment is distinguished from that of the first embodiment by assigning the reference symbol 11A. The clad part according to the second embodiment is distinguished from that of the first embodiment by assigning the reference symbol 23A. On the other hand, the same component as that of the first embodiment is assigned by the same reference symbol, and the descriptions thereof will be omitted.

<Configuration of Transmitting Optical Fiber>

Figure 8:
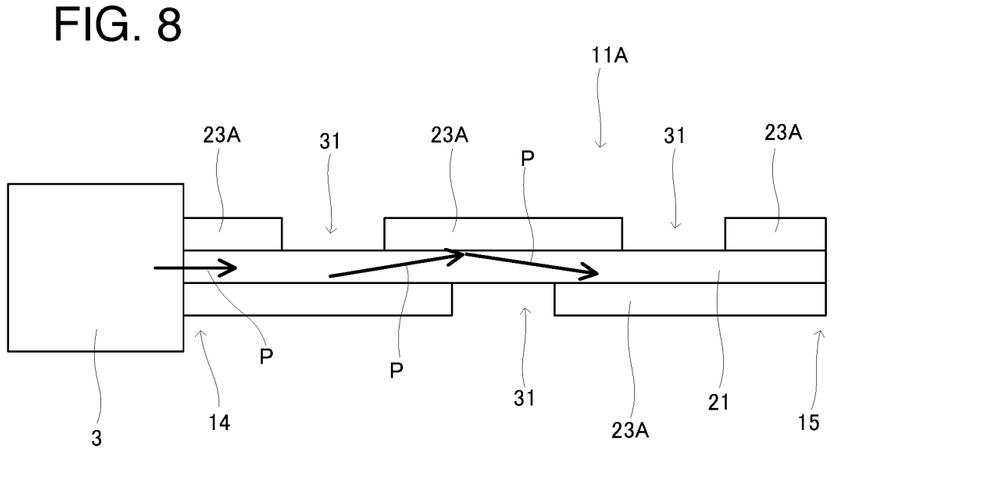
FIG. 8 is a cross-sectional view illustrating a main part of an optical communication device according to a second embodiment.

As a feature of the transmitting optical fiber 11A according to the second embodiment, as shown in FIG. 8, one or two or more holes 31 are provided in the clad part 23A. The hole 31 penetrates the clad part 23A in a direction toward the side surface. The shape of the hole 31 may be appropriately changed to, for example, a circular shape, or a rectangular shape. The position where the hole 31 is provided and the number of the holes are appropriately set according to the position at which light is emitted to the side of the transmitting optical fiber 11A.

Figure 9:
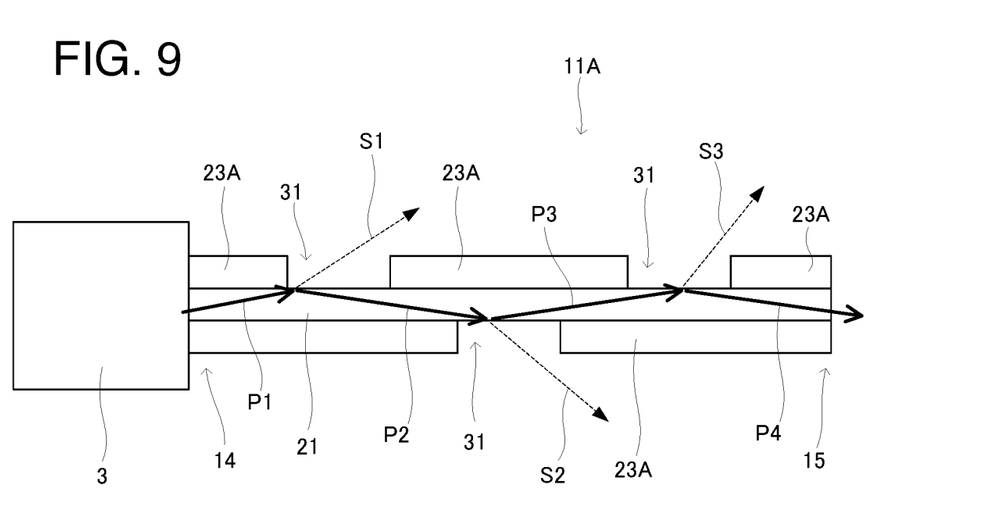
FIG. 9 is a cross-sectional view illustrating the features of the optical communication device according to the second embodiment.

By providing the hole 31 in the clad part 23A, at least a part of the light that transmits the core part 21 can be emitted from the side surface of the transmitting optical fiber 11A. That is, as shown in FIG. 9, the light P1 generated by the laser light source 3 and transmitted the core part 21 reaches the portion where the hole 31 is formed at the boundary surface between the core part 21 and the clad part 23A. Then, a part of the light P1 enters the hole 31 as entry light S1 and is emitted to the outside of the transmitting optical fiber 11 through the hole 31. The remaining part of the light P1 is reflected to the inside of the core part 21 as light P2.

Note that, unlike the first embodiment, the difference between the optical refractive index of the material constituting the clad part 23A and the optical refractive index of the material constituting the core part 21 according to the second embodiment are set to be large. That is, the light P generated by the laser light source 3 is totally reflected to the inside of the core part 21 when it reaches a portion of the boundary surface between the core part 21 and the clad part 23A where the hole 31 is not formed (see FIG. 8).

Therefore, of the side surface of the transmitting optical fiber 11A, the entry light S1 to S3 is emitted to the side from the portion where the hole 31 is formed, while the light is not emitted from the portion covered by the clad part 23A. Therefore, by appropriately selecting the position where the hole 31 is to be formed, it is possible to appropriately adjust the portion where the light is emitted from the side surface of the transmitting optical fiber 11A.

<Application Example of Second Embodiment>

Figure 10:
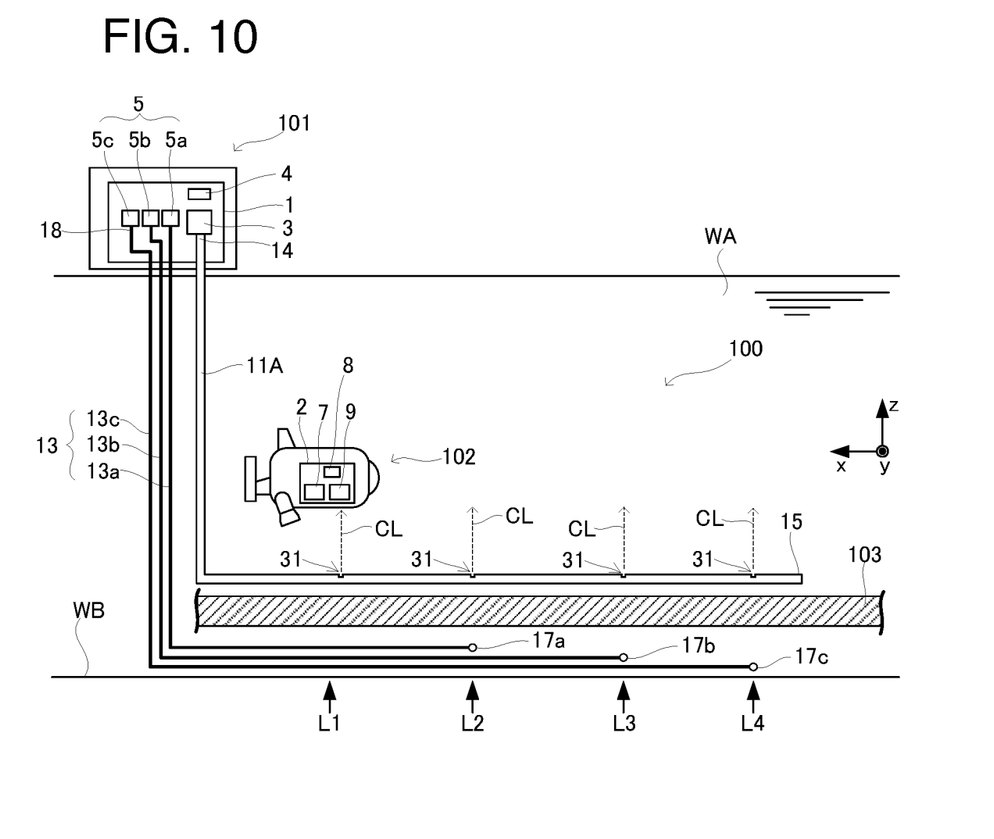
FIG. 10 is a diagram showing the state of using the optical communication device according to the second embodiment.

Next, an application example of the underwater inspection system 100 according to the second embodiment will be described. A series of operations for performing the inspection of the underwater structure 103 for the inspection points L 2 to L4 are the same as those of the first embodiment, and therefore, the descriptions thereof will be omitted.

In the second embodiment, as shown in FIG. 10, the holes 31 are arranged in accordance with the positions where the first optical communication device 1 performs optical wireless transmission to the second optical communication device 2. That is, the transmitting optical fiber 11A is arranged such that the holes 31 are arranged at four positions corresponding to the initial position L1 and the respective inspection points L2 to L4. Thus, the moving body 102 can receive the communication light CL emitted from the side surface of the transmitting optical fiber 11 through the holes 31 by moving to each of the initial position L1 and the inspection points L2 to L4. FIG. 10 shows the state in which the communication light CL emitted through the hole 31 is being received by the second optical communication device 2 provided in the moving body 102 at the initial position L1.

<Effects of Second Embodiment>

In the first optical communication device according to this embodiment, the clad part 23A is provided with one or two or more holes 31, and at least a part of the communication light CL is emitted from the side surface of the transmitting optical fiber 11A through the holes 31.

With this configuration, the transmitting optical fiber 11A can transmit the communication light CL not only in the direction toward the tip end portion 15 but also in the direction toward the side surface, in the same manner as in the first embodiment. With this configuration, the communication light CL can be emitted to a plurality of locations by using the single transmitting optical fiber 11A.

Further, in this embodiment, the portion where the communication light CL is emitted from the side surface of the transmitting optical fiber 11A can be limited to the portion where the hole 31 is formed. Therefore, it is possible to limit the amount of light leaking in the side surface direction of the transmitting optical fiber 11, and therefore, it is possible to avoid the light transmitted the core part 21 of the transmitting optical fiber 11A is undesirably attenuated. Further, by appropriately selecting the position of the hole 31, the part from which the communication light CL is emitted can be limited to a desired position at which the optical wireless communication is performed. Therefore, a situation in which the communication light CL is intercepted can be more reliably avoided, so that the reliability of the optical wireless communication can be improved.

Third Embodiment

Next, a third embodiment of the present invention will be described. In the third embodiment, the configuration of the receiving optical fiber 13 differs from the configuration of that of the first embodiment and the second embodiment. Therefore, the receiving optical fiber according to the third embodiment is distinguished from other embodiments by assigning the reference symbol 61.

<Configuration of Receiving Optical Fiber>

Figure 11:
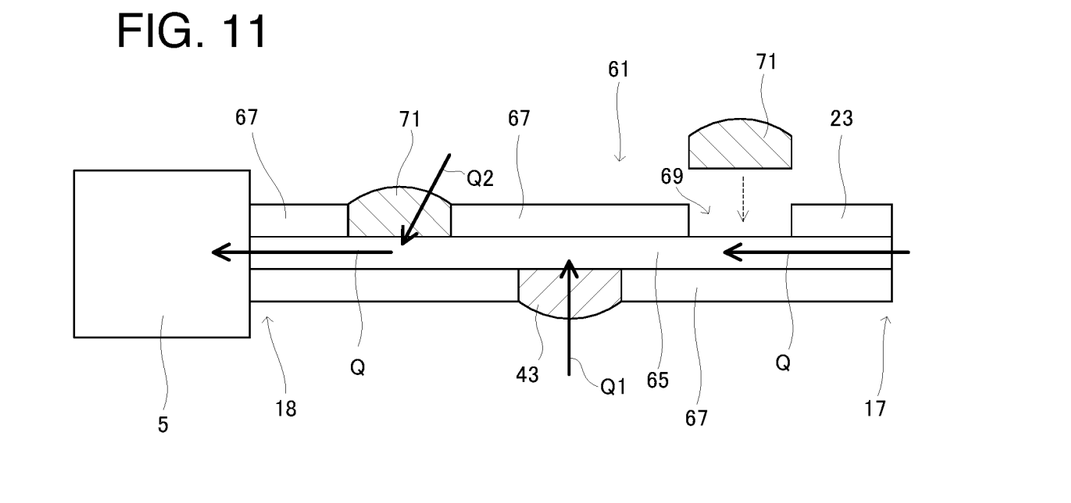
FIG. 11 is a cross-sectional view illustrating the main part of the optical communication device according to a third embodiment.

The configuration of the receiving optical fiber 61 according to the third embodiment is as shown in FIG. 11. The receiving optical fiber 61 is provided with a core part 65 constituting the center portion of the receiving optical fiber 61 and a clad part 67 covering the peripheral side part of the core part 65. The light incident on the receiving optical fiber 61 is transmitted toward the second end portion 18 by mainly passing through the interior of the core part 65.

Then, as a feature of the receiving optical fiber 61 according to the third embodiment, it is configured to be able to enter light from a plurality of locations. As a specific configuration, one or two or more holes 69 are provided in the clad part 67. The hole 69 is configured to penetrate the layer of the clad part 67. In each of the holes 69, a condenser lens 71 is fitted. That is, the receiving optical fiber 61 is provided with one or more condenser lenses 71 on the peripheral side part. The condenser lens 71 corresponds to the light incident part in the present invention.

Each of the condenser lenses 71 condenses the light directed to the receiving optical fiber 61 from the side surface direction of the receiving optical fiber 61 and guides the light to the core part 65. Therefore, the receiving optical fiber 61 not only allows the light from the first end portion 17 but also allows the light from the portion of the side surface where the condenser lens 71 is formed.

The light Q incident on the receiving optical fiber 61 from the first end portion 17, and the light Q1 and Q2 incident from the side surface through the condenser lenses 71 are transmitted to the second end portion 18 through the core part 65 and received by the light-receiving element 5 of the first optical communication device 1. Thus, with the configuration in which the condenser lenses 71 are arranged on the side surface of the receiving optical fiber 61, it is possible to allow the light exemplified by the communication light CL to be incident from a plurality of locations using a single receiving optical fiber 61. Further, by appropriately selecting the position where the condenser lens 71 is formed in the clad part 67, it is possible to appropriately adjust the position of the portion capable of allowing the light to be incident from the side surface of the transmitting optical fiber 11A.

<Application Example of Third Embodiment>

Figure 12:
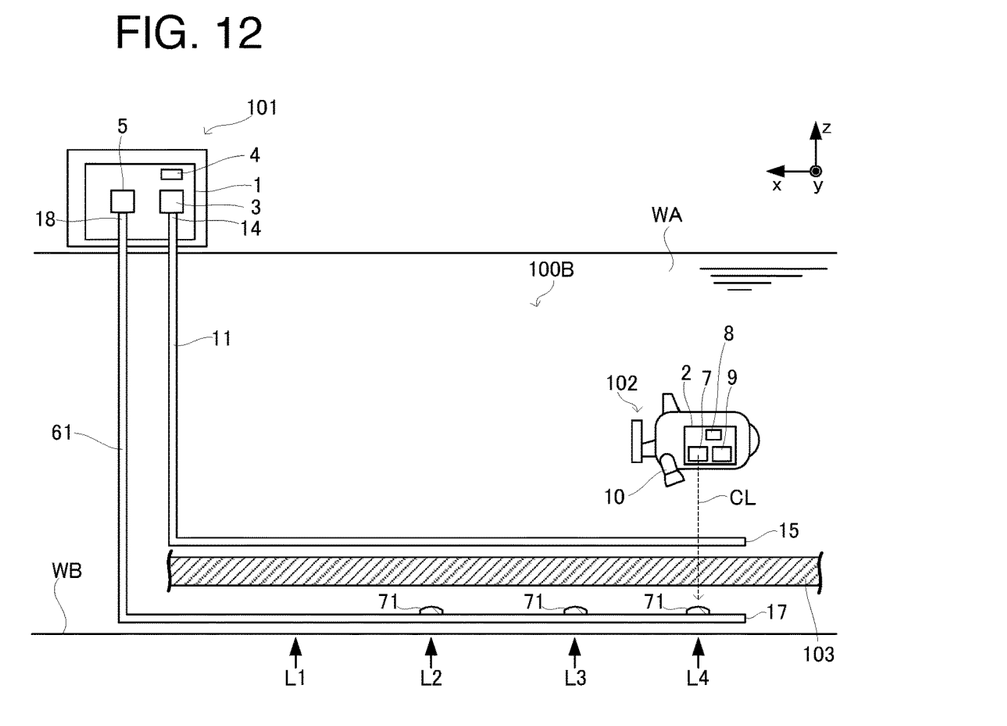
FIG. 12 is a diagram showing the state of using the optical communication device according to the third embodiment.

Next, an application example of the underwater inspection system 100B according to the third embodiment will be described. A series of operations for performing the inspection of the underwater structure 103 for the inspection points L2 to L4 are the same as those of the first embodiment, and therefore, the descriptions thereof will be omitted.

In the underwater inspection system 100B according to the third embodiment, as shown in FIG. 12, instead of a plurality of receiving optical fibers 13, a single receiving optical fiber 61 is used. Depending on the positions where the second optical communication device 2 provided in the moving body 102 performs optical wireless transmission with the first optical communication device 1, the condenser lenses 71 are arranged. That is, the receiving optical fiber 61 is arranged such that the condenser lenses 71 are arranged at four positions corresponding to the initial position L1 and the respective inspection points L2 to L4. Therefore, the moving body 102 can cause the communication light CL emitted from the laser light source 7 to be incident on the receiving optical fiber 61 by moving to each of the initial position L1 and the inspection points L2 to L4.

FIG. 12 shows the state in which the moving body 102 has moved to the inspection point L4 and then the communication light CL is emitted from the laser light source 7. The communication light CL propagates through the water WA and is focused on the condenser lens 71 arranged at the position corresponding to the inspection point L4 to be incident on the receiving optical fiber 61. The communication light CL which has entered the receiving optical fiber 61 is transmitted to the second end portion 18 and received by the light-receiving element 5.

<Effects of Third Embodiment>

In the first optical communication device 1 according to this embodiment 1, the first optical communication device 1 is provided with the light-receiving element 5 for receiving communication light CL and the receiving optical fiber 61 arranged in the water WA to guide the communication light CL to the light-receiving element 5. The receiving optical fiber 61 is provided with the core part 65 for transmitting the communication light CL and the clad part 67 covering the core part 65. On the peripheral side part of the clad part 67, one or two or more condenser lenses 71 for receiving the communication light CL are provided.

With this configuration, the receiving optical fiber 61 can allow the communication light CL to be incident from the side surface. Therefore, by using a single receiving optical fiber 61, it is possible to receive the communication light CL from the plurality of locations.

Further, in this embodiment, it is possible to limit a portion for allowing the entry of the communication light CL from the side surface of the receiving optical fiber 61. It is, therefore, possible to limit the portion that receives the communication light CL from the side surface direction to a desired position where the optical wireless communication is performed. Therefore, in a case where the light is irradiated to the part of the clad part 67 where the condenser lens 71 is not formed, it is possible to more reliably avoid the situation in which the light is received as communication light CL, and therefore, it is possible to improve the reliability of the optical wireless communication.

<Aspect>

It will be understood by those skilled in the art that the above-described exemplary embodiments are concrete examples of the following aspects.

(Item 1)

An underwater optical communication device according to one aspect of the present invention includes:
- a light-emitting element configured to emit communication light; and
- an optical fiber arranged in water, the optical fiber having a light incident end portion on which the communication light is incident and a tip end portion, the optical fiber being configured to transmit the communication light incident on the light incident end portion toward the tip end portion,
- wherein the optical fiber is composed of:
- a core part configured to transmit the communication light from the light incident end portion toward the tip end portion; and
- a clad part covering the core part, the clad part being configured to emit at least a part of the communication light that transmits the core part from a side surface of the optical fiber.

According to the underwater optical communication device according to the first aspect of the present invention, the communication light emitted by the light-emitting element is transmitted from the light incident end portion of the optical fiber toward the tip end portion and is emitted from the side surface of the optical fiber. Therefore, a single optical fiber can transmit a signal in a plurality of directions, i.e., toward the tip end portion and the side surface sides. Therefore, an optical communication device that performs optical communication to various locations can be realized in a simpler configuration.

(Item 2)

In the underwater optical communication device as recited in the above-described Item 1, it may be configured such that an optical refractive index of a material constituting the core part and an optical refractive index of a material constituting the clad part are set such that at least a part of the communication light that transmits the core part is emitted from the side surface of the optical fiber via the clad part.

According to the underwater optical communication device as recited in the above-described Item 2, since it is possible to emit at least a part of the communication light from the entire side surface of the clad part, by using a single optical fiber, it is possible to transmit the communication light to more locations. Further, since the clad part for emitting light to the side surface can be realized by selecting the material having an appropriate optical refractive index, it is easy to produce the optical fiber.

(Item 3)

The underwater optical communication device as recited in the above-described Item 1 or 2, it may be configured such that the clad part is provided with one or two or more holes, and at least the part of the communication light is emitted from the side surface of the optical fiber via the hole.

According to the optical communication device as recited in the above-described Item 3, it is possible to transmit the communication light toward the side surface of the optical fiber via the hole. This configuration allows the communication light to be emitted to a plurality of locations using a single optical fiber. Further, the portion where the communication light is emitted from the side surface of the optical fiber can be limited to the portion where the hole is formed. Therefore, it is possible to limit the amount of the light leaking toward the side surface of the optical fiber, and therefore, it is possible to avoid unnecessary attenuation of the light transmitted through the optical fiber. Further, by appropriately selecting the position of the hole, the portion where the communication light is emitted can be limited to a desired position for performing the optical wireless communication. Therefore, a situation in which the communication light is intercepted can be more reliably avoided, so that the reliability of the optical wireless communication can be improved.

(Item 4)

An underwater optical communication device according to one aspect of the present invention include:
- a light-receiving element configured to receive communication light; and
- an optical fiber arranged in water, the optical fiber being configured to guide the communication light to the light-receiving element,
- wherein the optical fiber is composed of:
- a core part configured to transmit the communication light; and
- a clad part covering the core part, and
- wherein a peripheral side part of the clad part is provided with one or two or more light incident parts on which the communication light is incident.

According to the optical communication device as recited in the above-described Item 4, the optical fiber can allow the communication light to enter from the side surface. Therefore, a single optical fiber can be used to receive the communication light from a plurality of locations. Further, the portion for allowing the communication light to enter from the side surface of the optical fiber can be limited to the portion where the light incident part is formed. It is, therefore, possible to limit the portion for receiving the communication light from the side surface to a desired position for performing the optical wireless communication. Therefore, in a case where the light is irradiated to a part of the clad part where the light incident part is not formed, it is possible to more reliably avoid the situation in which the light is received as communication light by confusion, it is possible to improve the reliability of the optical wireless communication.

(Item 5)

An underwater inspection system equipped with the underwater optical communication device as recited in any one of the above-described Items 1 to 3, the underwater inspection system includes:
- a mobile inspection body configured to inspect a structure as an inspection target extending in a predetermined direction while moving in the predetermined direction, wherein the optical fiber is arranged along the structure, and
- wherein the mobile inspection body is provided with:
- a light receiver configured to receive the communication light emitted from a side surface of the clad part; and
- a controller configured to control the mobile inspection body based on the communication light received by the light receiver.

According to the underwater inspection system as recited in the above-described Item 5, when the mobile inspection body inspects a structure while moving in a predetermined direction, it can receive the communication light emitted from the side surface of the optical fiber at the plurality of positions. That is, the optical communication device 1 using a single optical fiber is used as the sender, and the mobile inspection body can receive the communication light at several locations. Therefore, an underwater inspection system capable of inspecting a structure at a plurality of locations while performing optical wireless communication can be realized by using a single optical fiber.

(Item 6)

In the underwater inspection system as recited in the above-described Item 5, it may be configured such that the structure is a pipeline and the mobile inspection body is a submarine.

According to the underwater inspection system as recited in the above-described Item 6, the underwater inspection system for inspecting a plurality of points of a pipeline arranged on a water bottom or the like by a submarine moving along predetermined directions can be realized at low cost.

Further, the optical refractive index of the material constituting the core part 21 and the optical refractive index constituting the clad part 23 are set such that at least a part of the communication light CL that transmits the core part 21 is emitted from the side surface of the transmitting optical fiber 11 through the clad part 23.

Further, the underwater inspection system 100 according to this embodiment is further provided with a first optical communication device 1 and a moving body 102 for inspecting an underwater structure 103, which is an inspection target and extends in the x-direction, while moving in the x-direction. The transmitting optical fiber 11 is arranged along the underwater structure 103. The moving body 102 is provided with a light-receiving element 9 for receiving the communication light CL emitted from the side surface of the clad part 23 and a controller 8 for controlling the moving body 102 based on the communication light CL received by the light-receiving element 9.

With this configuration, the moving body 102 can receive the communication light CL emitted from the side surface of the transmitting optical fiber 11 at a plurality of positions when inspecting the underwater structure 103 while moving in the x-direction. That is, the first optical communication device 1 using one transmitting optical fiber 11 as a sender, the moving body 102 can receive the communication light CL at a plurality of locations. Therefore, an underwater inspection system 100 capable of inspecting an underwater structure 103 of a plurality of locations while performing the optical wireless communication can be realized by using a single transmitting optical fiber 11.

Further, in the underwater inspection system 100 according to this embodiment, the underwater structure 103 is a pipeline, and the moving body 102 is a submarine. With this configuration, an underwater inspection system for inspecting a plurality of locations of the pipeline arranged on the water bottom WB or the like by the submarine moving along a predetermined direction is realized at low cost.

Other Embodiments

It should be understood that the examples disclosed herein are illustrative in all aspects and are not restrictive. The scope of the present invention includes all changes within claims and the meanings and the range equivalent to the claims. For example, the present invention may be modified as follows.

(1) In each of the above-described embodiments, the transmitting optical fiber 11 is not limited to a configuration that can emit light from the tip end portion 15. That is, it may be configured such that the tip end portion 15 is coated with a light-reflecting material or the like to prevent the light transmitted to the tip end portion 15 from emitting from the tip end portion 15. In this case, all of the light incident on the core part 21 through the base end portion 14 from the laser light source 3 will be emitted from the side surface of the transmitting optical fiber 11 through the clad part 23.

Figure 13:
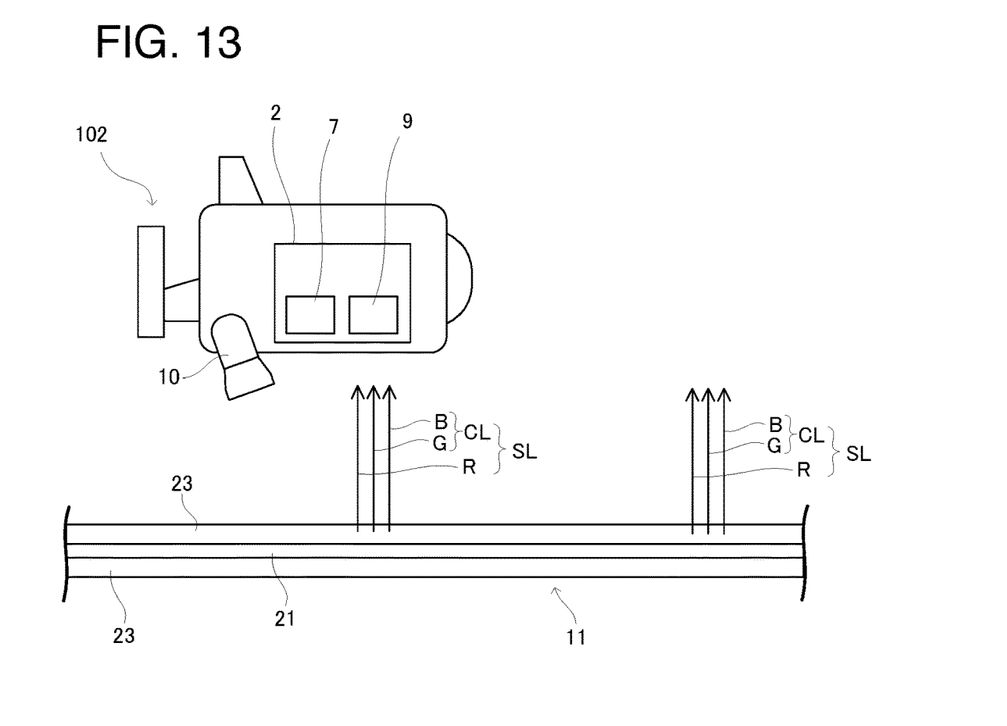
FIG. 13 is a diagram showing a configuration according to a modification.

(2) In each of the above-described embodiments, it is not limited to a configuration in which only the communication light CL is emitted from the side surface of the transmitting optical fiber 11. That is, as shown in FIG. 13, in addition to the blue light B and the green light G constituting communication light CL, it may be performed the optical wireless communication with the second optical communication device 2 by emitting red light R from the side surface of the transmitting optical fiber 11. By adding the red light R to the the blue light B and the green light G, the illumination light SL as a whole becomes white light.

By emitting the illumination light SL from the side surface of the transmitting optical fiber 11, the illumination light SL becomes a route indicating the path of the transmitting optical fiber 11. That is, while being controlled by the illumination light SL included in the communication light CL, the moving body 102 can perform the imaging or the moving to the next inspection point of the underwater structure 103 by utilizing the illumination light SL emitted from the side surface of the transmitting optical fiber 11. In this case, miniaturization and weight reduction of the moving body 102 can be easily realized since there is no need to mount a lighting device on the moving body 102.

(3) In each of the above-described embodiments, the fixed station 101 equipped with the first optical communication device 1 may be arranged in water. Further, the configuration of the first optical communication device 1 may be applied to the second optical communication device 2. Furthermore, the first optical communication device 1 is not limited to the configuration in which it is arranged in a fixed structure but may be arranged in a moving structure.

(4) In each of the above-described embodiments, although the underwater inspection system 100 is configured to perform the optical wireless communication between the two optical communication devices, it may be performed the optical wireless communication between three or more optical communication devices.

DESCRIPTION OF SYMBOLS

1: First optical communication device
2: Second optical communication device
3: Laser light source
4: Control unit
5: Light-receiving element
7: Laser light source
8: Control unit
9: Light-receiving element
10: Observation device
11: Transmitting optical fiber
13: Receiving optical fiber
14: Base end portion
15: Tip end portion
21: Core part
23: Clad part
31: Hole
61: Receiving optical fiber
65: Core part
67: Clad part
69: Hole
71: Condenser lens
100: Underwater inspection system
101: Fixed station
102: Moving body
103: Underwater structure

The invention claimed is:

1. An underwater optical communication device comprising:
   a light-emitting element configured to emit communication light to a moving body as a communication target; and
   an optical fiber arranged along an underwater structure extending in a predetermined direction, the optical fiber having a light incident end portion on which the communication light emitted from the moving body is incident and a tip end portion, the optical fiber being configured to transmit the communication light incident on the light incident end portion toward the tip end portion,
   wherein the optical fiber is composed of:
   a core part configured to transmit the communication light from the light incident end portion toward the tip end portion; and
   a clad part covering the core part, the clad part being configured to emit at least a part of the communication light that transmits the core part from a side surface of the optical fiber.

2. The underwater optical communication device as recited in claim 1,
   wherein an optical refractive index of a material constituting the core part and an optical refractive index of a material constituting the clad part are set such that at least a part of the communication light that transmits the core part is emitted from the side surface of the optical fiber via the clad part.

3. The underwater optical communication device described in claim 1,
   wherein the clad part is provided with one or two or more holes, and
   wherein at least the part of the communication light is emitted from the side surface of the optical fiber via the hole.

4. An underwater optical communication device comprising:
   a light-receiving element configured to receive communication light emitted from a moving body as a communication target; and
   an optical fiber arranged along an underwater structure extending in a predetermined direction, the optical fiber being configured to guide the communication light to the light-receiving element,
   wherein the optical fiber is composed of:
   a core part configured to transmit the communication light; and
   a clad part covering the core part, and
   wherein a peripheral side part of the clad part is provided with one or two or more light incident parts on which the communication light is incident.

5. An underwater inspection system equipped with the underwater optical communication device as recited in claim 1, the underwater inspection system comprising:
   a mobile inspection body configured to inspect a structure as an inspection target extending in a predetermined direction while moving in the predetermined direction,
   wherein the optical fiber is arranged along the structure, and
   wherein the mobile inspection body is provided with:
   a light receiver configured to receive the communication light emitted from a side surface of the clad part; and
   a controller configured to control the mobile inspection body based on the communication light received by the light receiver.

6. The underwater inspection system equipped with the underwater optical communication device as recited in claim 5,
   wherein the structure is a pipeline and
   wherein the mobile inspection body is a submarine.

7. The underwater communication device as recited in claim 1,
   wherein the moving body is a moving inspection device configured to inspect the underwater structure at inspection points, and
   wherein the optical fiber is provided with holes arranged at positions corresponding to the inspection points.

* * * * *